(12) United States Patent
Niss

(10) Patent No.: US 11,629,695 B2
(45) Date of Patent: Apr. 18, 2023

(54) METHOD FOR OPERATING A WIND TURBINE

(71) Applicant: Nordex Energy SE & Co. KG, Hamburg (DE)

(72) Inventor: Michael Niss, Arden (DK)

(73) Assignee: Nordex Energy SE & Co. KG, Hamburg (DE)

( * ) Notice: Subject to any disclaimer, the term of this patent is extended or adjusted under 35 U.S.C. 154(b) by 344 days.

(21) Appl. No.: 16/737,486

(22) Filed: Jan. 8, 2020

(65) Prior Publication Data

US 2020/0217298 A1    Jul. 9, 2020

(30) Foreign Application Priority Data

Jan. 8, 2019  (EP) ..................................... 19150807

(51) Int. Cl.
| | | |
|---|---|---|
| *F03D 7/02* | (2006.01) | |
| *F03D 7/04* | (2006.01) | |
| *F03D 17/00* | (2016.01) | |

(52) U.S. Cl.
CPC ......... *F03D 7/0264* (2013.01); *F03D 7/0288* (2013.01); *F03D 7/043* (2013.01); *F03D 17/00* (2016.05)

(58) Field of Classification Search
CPC ...... F03D 7/0264; F03D 7/0288; F03D 7/043; F03D 17/00
USPC ....................................................... 700/278
See application file for complete search history.

(56) References Cited

U.S. PATENT DOCUMENTS

| | | | |
|---|---|---|---|
| 7,964,979 B2 | 6/2011 | Miranda et al. | |
| 9,366,235 B2 | 6/2016 | Evans | |
| 9,624,905 B2 | 4/2017 | Perley et al. | |
| 2010/0290905 A1* | 11/2010 | Knudsen | ................. F03D 7/043 416/31 |

(Continued)

FOREIGN PATENT DOCUMENTS

| | | |
|---|---|---|
| EP | 2860394 A2 | 4/2015 |
| WO | 2011042369 A2 | 4/2011 |

(Continued)

OTHER PUBLICATIONS

Hartvig Morten Hansen, "Method and Apparatus for Wind Turbine Control Without Source Controller Alteration" (WO2019238189 A1 Translation), Jun. 12, 2018, ESPACENET translation (Year: 2018).*

*Primary Examiner* — Rocio Del Mar Perez-Velez
*Assistant Examiner* — Christopher W Carter
(74) *Attorney, Agent, or Firm* — Walter Ottesen, P.A.

(57) ABSTRACT

A method for operating a wind turbine wherein a parameter for a wind hitting the wind turbine is determined from present values for the generator speed and/or the wind speed at each point in time (t). A temporal change variable is formed for the parameter at each point in time (t). For the temporal change variables, which occurred in a past time interval, the third and/or fourth statistical moment is calculated for a distribution of the temporal change values in the time interval. If at least one of the statistical moments exceeds a predetermined value, then a detection signal is set for an extreme gust, which triggers one or both of the steps: increasing a setpoint value for the blade pitch angle starting from an actual value thereof, and reducing a setpoint value for the generator speed starting from an actual value thereof.

20 Claims, 3 Drawing Sheets

(56) References Cited

U.S. PATENT DOCUMENTS

| | | | |
|---|---|---|---|
| 2012/0193918 A1* | 8/2012 | Mascarell | F03D 7/0224 290/44 |
| 2013/0033040 A1* | 2/2013 | Bowyer | F03D 7/043 290/44 |
| 2014/0140843 A1* | 5/2014 | Spruce | F03D 7/042 416/61 |
| 2014/0377064 A1 | 12/2014 | Kristoffersen et al. | |
| 2015/0233350 A1* | 8/2015 | Obrecht | F03D 17/00 416/1 |
| 2017/0321654 A1 | 11/2017 | Zheng et al. | |
| 2018/0171978 A1 | 6/2018 | Spruce | |
| 2020/0025648 A1* | 1/2020 | Haseba | G01M 13/028 |

FOREIGN PATENT DOCUMENTS

| | | |
|---|---|---|
| WO | 2011161434 A2 | 12/2011 |
| WO | 2017000953 A1 | 1/2017 |

\* cited by examiner

METHOD FOR OPERATING A WIND TURBINE

CROSS REFERENCE TO RELATED APPLICATION

This application claims priority of European patent application no. 19150807.6, filed Jan. 8, 2019, the entire content of which is incorporated herein by reference.

FIELD OF THE INVENTION

The present invention relates to a method for operating a wind turbine.

BACKGROUND OF THE INVENTION

Certain configuration requirements for the construction of wind turbines are specified by standards, such as for example the IEC 61400-1 (2014-04). Chapter 6.3.2 of the IEC 61400-1 (2014-04) describes extreme wind situations, as occur for example at high peak wind speeds during storms and rapid changes in wind speed and wind direction. A method according to the disclosure is concerned in particular with an Extreme Gust Load Mitigation (EGLM), in other words an avoidance of loads due to extreme gusts.

A control method for a wind turbine became known from U.S. Pat. No. 7,964,979, in which a variation parameter is determined, which represents a variance of an operating parameter over time. For example, the blade pitch angle, the rotor speed, a generator speed of the wind turbine and the wind speed are hereby evaluated as operating parameters. The variation parameter reflects the variation of the operating parameters over time, wherein here it is geared towards the standard deviation and the variance or the mean of the parameters.

A system and method for avoiding excessive loads on a wind turbine is known from U.S. Pat. No. 9,624,905 B2. The method includes the steps for determining a current installation parameter, wherein an operating state of the wind turbine is accessed for this, which is negative for operating the wind turbine. The operating states of the wind turbine are saved for a certain time duration and a standard deviation is determined for the saved variables. Future parameters for the wind turbine are determined from these variables, wherein a maximum size is determined depending on the standard deviation of the saved parameters. The wind turbine is then controlled depending on the difference between the maximum wind turbine parameter and the parameter setpoint value, in order to avoid excessive loads on the wind turbine.

A method for determining a maximum overload of a wind turbine working under non-standard conditions became known from US 2018/0171978 A1.

A method for controlling a wind turbine, in which training data for one or more captured variables is saved, is known from U.S. Pat. No. 9,366,235. A risk category is assigned to the training data based on the measured data. During the operation of the wind turbine, a gust risk is determined in that a characteristic vector is periodically extracted from the measured data and compared with the variables obtained from the training data. The mean or the covariance is used for example for the comparison. In multi-dimensions, the Mahalanobis distance is used to assess the gust risk.

SUMMARY OF THE INVENTION

A decisive step in the detection is detecting arising extreme conditions as early as possible, in particular extreme wind gusts. It is an object of the invention to provide a method for early detection of extreme wind gusts. The object can, for example, be achieved via a method for operating a wind turbine. The method includes the steps of:

a. currently determining an indicative parameter ($A(t)$) for a wind hitting the wind turbine from present values for at least one of a generator speed ($n_{Gen}(t)$) and a wind speed ($v_{wind}(t)$) at each point in time (t);

b. forming a temporal change variable ($dA(t)$) for the parameter ($A(t)$) at each point in time (t);

c. calculating at least one of a third and fourth statistical moment for the temporal change variables ($dA(t)$), which occurred in a past time interval ($[t-T, t]$), wherein the at least one of the third and fourth statistical moment ($M_3$, $M_4$) is calculated for a distribution of the temporal change values in the time interval ($[t-T, t]$); and, d. setting a detection signal ($C_{EGLM}$) for an extreme wind gust if at least one of the statistical moments ($M_3$, $M_4$) exceeds a predetermined cut-in threshold value, wherein said setting the detection signal triggers at least one of the following further method steps:

i. increasing a setpoint value for a blade pitch angle ($\theta_{set}$); and ii. reducing a setpoint value for a generator speed ($n_{Gen,set}$).

The method is provided and determined for operating a wind turbine, wherein a detection signal for an extreme gust should be detected and corresponding method steps for protecting the wind turbine should be initiated. In the case of a method according to the disclosure, an indicative parameter for a wind hitting the wind turbine is determined continuously from present values for the generator speed and/or the wind speed. "Continuously" or respectively "at any point in time" hereby means that for example the parameter is currently determined in specified time increments on a regular or irregular basis. The parameter is characterized in that it is indicative of the wind hitting the wind turbine and accesses for this one or both values for the generator speed and the wind speed. In a method step, a temporal change variable is determined for each point in time. The method is thus geared directly to the change in the parameter. In a further step, the temporal change variables for a past time interval are assessed. A certain number of measurement values occur within a time interval, which take place for a corresponding number of temporal change variables. The temporal change variables are values, via which statistics can be obtained and which have a certain frequency distribution within the framework of the statistics. For the temporal change variables, which occurred in a past time interval, the third and/or fourth statistical moment is calculated for its distribution. The third statistical moment is also sometimes called the third central moment. After its standardization, this moment is also called skewness. The fourth statistical moment is also sometimes called the fourth central moment and describes the kurtosis after its normalization. Skewness and kurtosis are sometimes described together as higher moments. The kurtosis specifies a measurement for the deviation from the normal distribution, while the skewness is used as a measurement of the deviation from a symmetrical distribution.

Starting from at least one of the statistical moments, a comparison is performed with a predetermined cut-in threshold value. If at least one of the statistical moments exceeds the predetermined cut-in threshold value, then a detection signal for an extreme gust is set. The detection signal triggers either an increase in the blade pitch angle and/or a reduction in the generator speed. For the increase in the blade pitch angle, an actual value for the blade pitch angle is increased by an offset value, preferably starting from a setpoint value for the blade pitch angle. The setpoint value for the blade pitch angle can also be set to a predetermined constant value. To reduce the setpoint value for the generator speed, it is reduced by an offset value, preferably starting from an actual value of the generator speed. Here as well, the setpoint value for the generator speed can be set to a predetermined constant value. When using constant values, whether it be for the generator speed or for the blade pitch angle, it should be noted that the predetermined values lead to an increase in the blade pitch angle or to a reduction in the generator speed. The method is very sensitive for the emerging gusts in particular due to the gearing towards the third and fourth statistical moments. The disclosure is based on the knowledge that a change in the distribution towards an asymmetrical separation and towards a deviation from a normal distribution first occurs in a distribution of the parameters before a change in the mean and before a change in the standard deviation as the second statistical moment. These variables described by the third and fourth statistical moment should be captured in the data considerably earlier, as was empirically checked. In addition to this, the capturing of the third and fourth statistical moment is possible with a very high reliability so that there is no deterioration in the operation of the wind turbine. In addition to this, it was detected in the case of the invention to gear towards a distribution of the temporal change variables and not towards a distribution of the parameters themselves.

In a further embodiment of the method, a form of differential quotient or a form of temporal derivative is applied for the temporal change variable. The temporal derivative can be approximated in different manners. When considering the temporal change variable, it is important to note that at each or at almost each point in time a temporal change variable is defined, which is also accessible for the evaluation.

In a further embodiment, the parameter indicative of a wind hitting the wind turbine is the product of the generator speed and the wind speed. The wind speed can be geared towards a measured or an estimated wind speed, for example. Even the use of a wind speed estimator for the wind turbine provides very reliable results here. The generator speed can be geared towards a measured value of the speed or towards a setpoint value for the generator speed, which is predetermined by a controller.

As already mentioned, the third and fourth statistical moments are the moments that are also normally referred to as the third central moment and the fourth central moment in statistics. The third statistical moment hereby results as the formed expected value of the third power from the deviation of the expected value of the distribution from the values of the distribution. This means:

$$M_3 = E((X-\mu)^3) = E((X-E(X))^3),$$

wherein $E(\bullet)$ is the formation of the expected value of a random variable and $\mu = E(X)$ is the expected value of the distribution. The preceding equation should refer both to continuous as well as discrete random variables in their notation. For the calculation, iterative numeric methods can be used in order to calculate continuously the third statistical moment, for example.

The rule is thus that the expected value is first calculated for the change values recorded in the time interval. The deviation of the value from the expected value in the third power is then considered and the expected value is determined for this variable.

In the same manner, in the case of the fourth statistic moment, which describes the kurtosis after standardization, the following formula results here:

$$M_4 = E((X-\mu)^4) = E((X-E(X))^4),$$

wherein $E(\bullet)$ is the formation of the expected value of a random variable X.

In a further embodiment of the method, an offset value $\Delta\theta$ is provided for the blade pitch angle $\theta$, which depends on the value of the third and/or fourth statistical moment. In the case of an increasing value for the third and/or fourth statistical moment, the variable for the offset value hereby also increases. This approach is based on the fact that, with an increasing skewness, that is, an increasing deviation from a symmetrical distribution, stronger changes are to be expected from an extremely strong gust so that it can be advantageous here to reduce the power received from the wind to an increasing degree by a larger offset value for the blade pitch angle. Another approach using a dependency of the pitch angle offset on the blade bending moment is even better, wherein increasing values in the out of plane bending moment lead to increased pitch angle offset.

Similar to how the statistical moments set the detection signal for an extreme gust when exceeding a cut-in threshold value, the control of the wind turbine returns to normal operation when a predetermined shutdown threshold value is fallen short of. It is hereby provided that the return to normal operation takes place over a predetermined time duration, which can be set to be shorter or longer depending on the installation type and requirements. The normal operation can of course also thereby provide operating methods for the wind turbine, which are configured for other extreme wind conditions and wind loads.

In a method according to the disclosure, a series of plausibility checks can be provided for generating the detection signal. Included in these plausibility checks is that the detection signal for extreme gusts is only generated when the generator speed is greater than a minimum speed. If the generator speed is below a minimum speed, it should be expected that an occurring extreme gust does not lead to excess loads on the wind turbine. Another check criterion is that the detection signal for extreme gusts is only generated when the wind speed is greater than a minimum wind speed. Since the cut-in criteria are based on a change in the distribution of the speed change, it may well be that the criteria for generating the detection signal are also present in the case of lower wind speeds when there is no risk of an excessive load on the wind turbine. Thus, for values not greater than a minimum speed, a detection signal is not generated for extreme gusts. A further plausibility check for generating the detection signal is then present when the wind turbine is being operated and power is being fed into the grid. If the wind turbine is not being operated, but is instead for example in a parked position or the like, it is not necessary to perform the steps according to the disclosure for capturing extreme gusts and accordingly to control the controller of the wind turbine.

It is further provided that the detection signal for an extreme gust is only generated when the third statistical moment increases and lies above a predetermined minimum value. This means that the distribution changes towards larger values, wherein the values of the distribution are the temporal change variables so that the increasing third moment indicates that speed increases have occurred in an intensified manner. Accordingly, the wind turbine will then also only return to normal operation when the third statistical moment decreases, thus when there are no further increasing speed changes.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
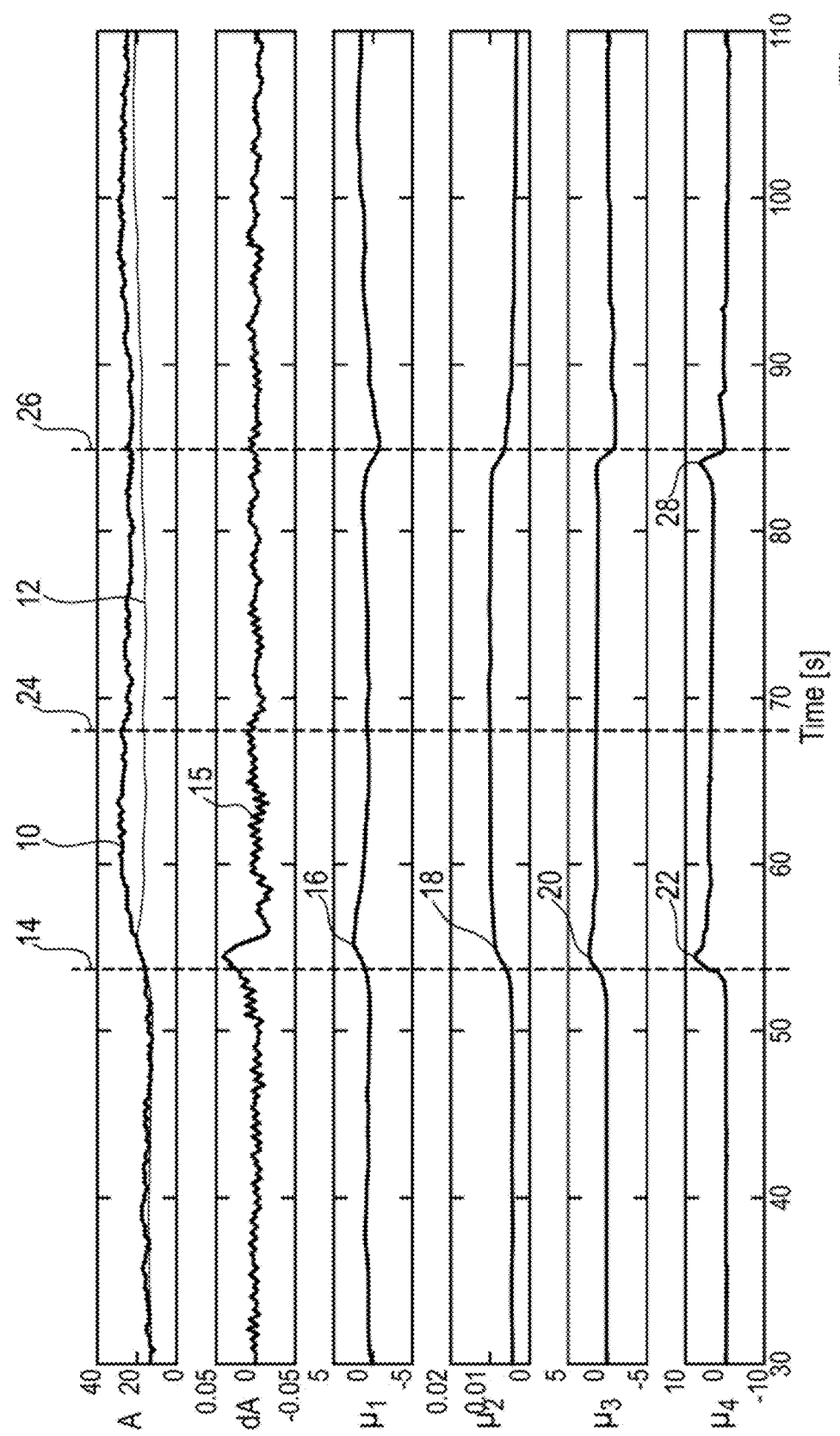
FIG. 1 shows a time series of input variables, their temporal derivative, their mean, their standard deviation as well as their skewness and kurtosis.

FIG. 1 shows the temporal progression in a time scale shown in seconds from point in time t=30 s to t=110 s. The upper representation shows the temporal progression of a parameter. The parameter is for example a value for the generator speed and/or for the wind speed. An estimated wind speed can preferably be used as the parameter. The shown diagram shows a dual line progression, wherein the line 10 is based on measured values for the wind speed and the line 12 on the estimated values for the wind speed. It can be clearly seen that the values of the wind estimator progress straighter but apparently also after the point in time indicated by the separation line 14; approximately at 54 s, the wind estimator with its values 12 specifies systematically lower values than the measured wind. The diagram below shows the temporal change in the input signal, wherein it is geared here towards the temporal change in the estimated signal 12. From both curves for the input signal and for its derivative, it is only qualitatively suggested at a high level that a gust occurred at point in time 14. The following diagram is geared towards the mean of the derived input variable. It can be clearly seen that the mean reaches a maximum 16 with a clear temporal delay with respect to the separation line 14.

The standardized skewness of the distribution is plotted in the diagram located further below. Here as well, the skewness clearly reaches its maximum after point in time 14. It is hard to see with the naked eye but the data statistically shows that the skewness here increases faster and thus exceeds a threshold value earlier than the mean with its value 16 and the standard deviation with its value 18. This is also clear in the kurtosis in the diagram located below it. Also here, the maximum value 22 is clearly after point in time 14, but the slope to the maximum value 22 is steeper. For the comparison, please note that the ordinate has a considerably different scale. If the mean is on a scale of $5 \times 10^{-3}$, then the kurtosis moves on a scale of 10, thus a factor that is 2,000 times greater. If one takes into consideration that this concerns the evaluation of statistical data, to which a certain fluctuation adheres, it also becomes clear that, with the skewness and the kurtosis, that is, the third and fourth statistical moments, there are variables that are better suited for a threshold comparison.

Figure 2:
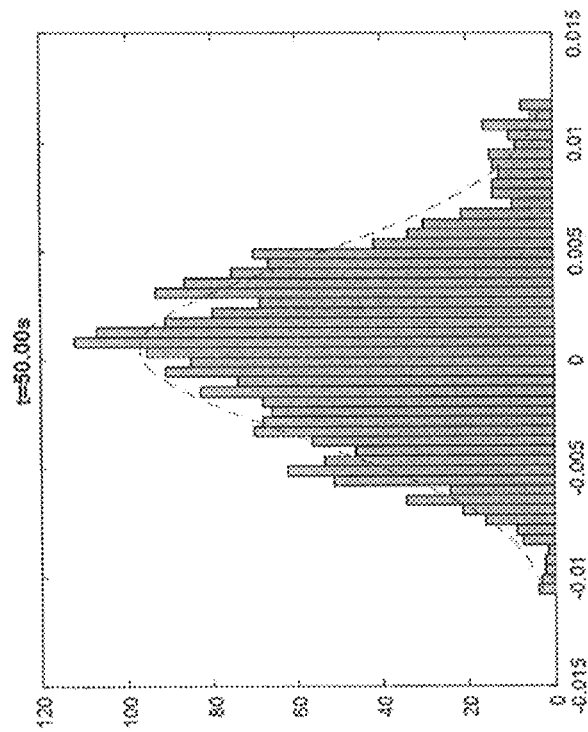
FIG. 2 shows the distribution of the derived input variable at point in time t=50 s.

FIG. 2 shows the distribution of the wind speed changes at point in time t=50 s. The dashed line shows that a normal distribution of the speed changes is mainly present here. The data was recorded for a time interval of 30 s. In terms of the length of the time interval, it should be taken into account that the longer the time interval the more measured values are available for the statistical evaluation, whereby the values are more accurate. On the other hand, a longer time interval can potentially always indicate a situation in which the wind conditions have changed, whereby the statistical accuracy decreases.

For the present example, a time interval of 30 s proved especially beneficial for the evaluation. However, time intervals of 10 s to 50 s can also be used.

Figure 3:
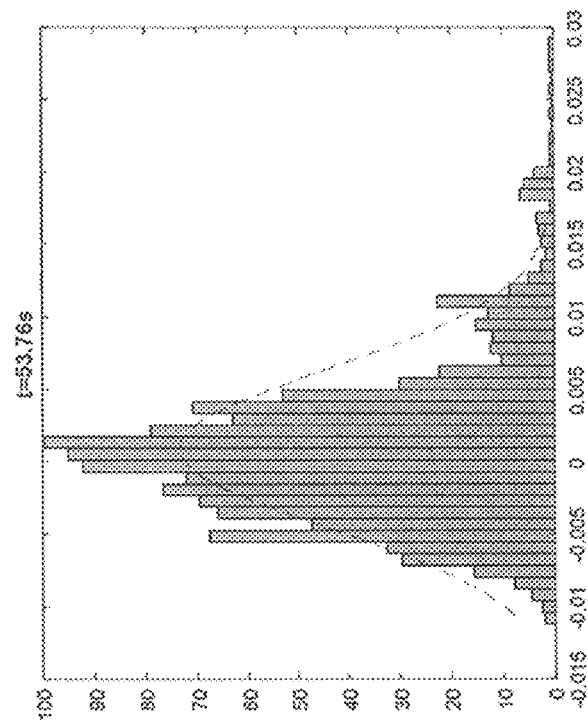
FIG. 3 shows the distribution at point in time t=53.76 s.

FIG. 3 shows the distribution of the wind speed changes at point in time t=53.76 s. This mainly corresponds with point in time 14 from FIG. 1. It can be clearly seen that larger values, for example values greater than 0.01, occur increasingly in the speed change. It should thus be expected that here the third statistical moment is activated as the measure for the asymmetry of the distribution and provides a clear value.

Figure 4:
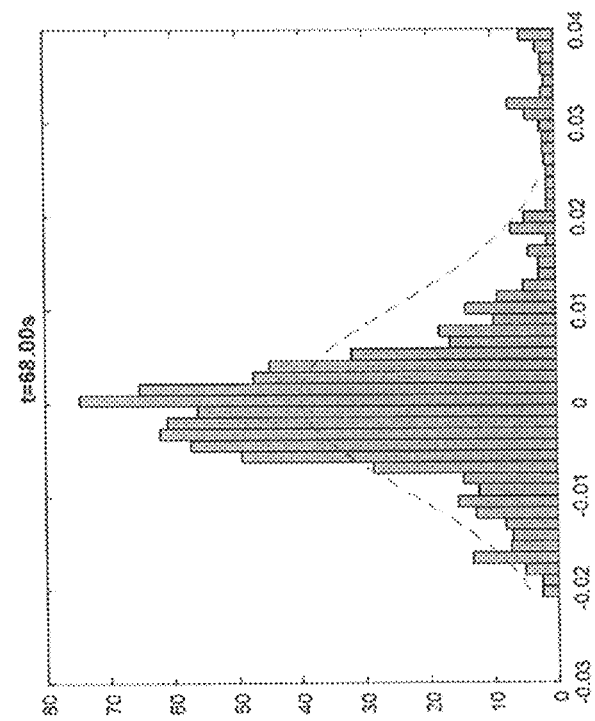
FIG. 4 shows the distribution of the derived input variable at t=68 s; and, FIG. 5 shows the distribution of the derived input variable at point in time t=85 s.

FIG. 4 shows the point in time t=68 s, which is drawn in FIG. 1 as point in time 24. It can be seen here that even greater positive wind speed changes occur. A large third statistical moment should thus be present. At the same time, it should also be expected that the distribution in FIG. 4 can no longer be interpreted well as a normal distribution; in this respect, the fourth statistical moment should have a positive value as the kurtosis measure.

Figure 5:
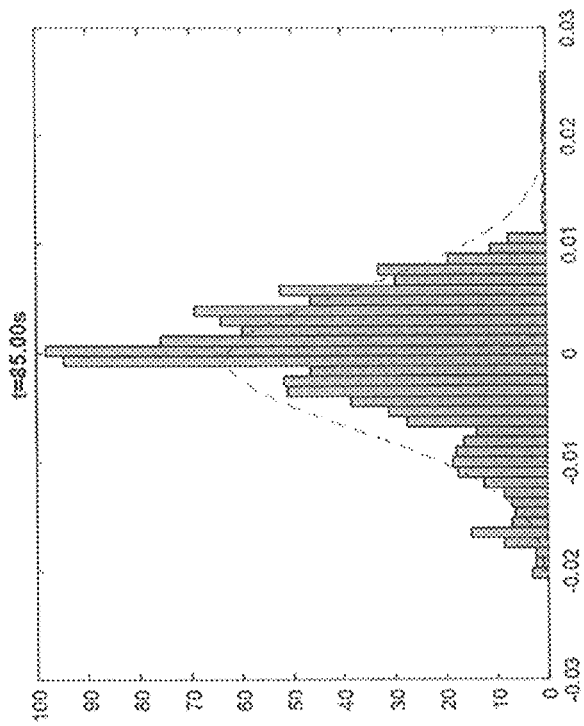

FIG. 5 shows the distribution of the wind speed change at point in time 26 in FIG. 1. An overhang of negative wind speed changes can be clearly seen; this can be due to the fact that positive speed changes from an earlier point in time fall out of the time frame of the statistics. For example, a time frame of 30 s can be provided so that all speed changes that lie further in the past are no longer taken into consideration. What is to be expected at this point in time is a negative third moment. Even the fourth moment as kurtosis and measure for the deviation from the normal distribution has a peak again here, which is indicated in FIG. 1 with 28.

In the above discussion, the aspect of the standardization of the moments for skewness and kurtosis was not covered. The standardization also depends on the standard deviation so that for turbulent wind with a large standard deviation the higher statistical moments are smaller, which can require an adjustment of threshold values. Furthermore, when calculating the distribution for the past time interval, a time duration of 30 s was assumed and the distribution was calculated continuously. For this, a series of numerical standard methods exist, which allow a continuous, numerical calculation of the distribution.

It is understood that the foregoing description is that of the preferred embodiments of the invention and that various changes and modifications may be made thereto without departing from the spirit and scope of the invention as defined in the appended claims.

What is claimed is:

1. A method for operating a wind turbine, the method comprising the steps of:
    a) detecting at least one of a generator speed ($n_{Gen}(t)$) and a wind speed ($v_{wind}(t)$);
    b) on a regular or irregular basis, determining a parameter ($A(t)$) indicative of a wind hitting the wind turbine from present values for the at least one of a generator speed ($n_{Gen}(t)$) and a wind speed ($v_{wind}(t)$) at each point in time (t);
    c) forming a temporal change variable ($dA(t)$) for the parameter ($A(t)$) at each point in time (t);

d) calculating at least one of a third and fourth statistical moment for the temporal change variables (dA(t)), which occurred in a past time interval ([t−T, t]), wherein the at least one of the third and fourth statistical moment ($M_3$, $M_4$) is calculated for a distribution of the temporal change values in the time interval ([t−T, t]); and, e) setting a detection signal ($C_{EGLM}$) for an extreme wind gust if only one of the statistical moments ($M_3$, $M_4$) exceeds a predetermined cut-in threshold value, wherein said setting the detection signal triggers at least one of the following further method steps for protecting the wind turbine against wind damage:

i. increasing a setpoint value for a blade pitch angle ($\theta_{set}$) causing the blade pitch to increase; and ii. reducing a setpoint value for a generator speed ($n_{Gen,set}$) causing the generator speed to decrease.

2. The method of claim 1, wherein the setpoint value for the generator speed ($n_{Gen,set}$) is reduced by an offset value ($\Delta n$) starting from an actual value for the generator speed ($n_{Gen,act}$) or is set to a predetermined value ($n_{fix}$).

3. The method of claim 1, wherein the setpoint value for the blade pitch angle ($\theta_{set}$) is increased by an offset value ($\Delta\theta$) starting from an actual value for the blade pitch angle ($\theta_{act}$) or is set to a predetermined value ($\theta_{fix}$).

4. The method of claim 1, wherein the temporal change variable (dA(t)) is determined in the form of a differential quotient ($\Delta A$) or a temporal derivative (dA/dt).

5. The method of claim 1, wherein the parameter (A(t)) is determined as the product of the generator speed ($n_{Gen}$) and wind speed ($v_{wind}$).

6. The method of claim 1, wherein the value of the wind speed ($v_{wind}$) is a measured or an estimated value.

7. The method of claim 5, wherein the value for the generator speed ($n_{Gen}$) is a measured value or a setpoint value for the generator speed specified by a controller.

8. The method of claim 1, wherein the third statistical moment is calculated as $M_3=E((X-\mu)^3)$, wherein $E(\cdot)$ specifies a formation of an expected value, X specifies values of the distribution and $\mu=E(X)$ specifies an expected value of the distribution.

9. The method of claim 1, wherein the fourth statistical moment is calculated as $M_4=E((X-\mu)^4)$, wherein $E(\cdot)$ specifies a formation of an expected value, X specifies values of the distribution and $\mu=E(X)$ an expected value of the distribution.

10. The method of claim 3, wherein the offset value ($\Delta\theta$) for the blade pitch angle ($\theta$) depends on the value of the fourth statistical moment ($M_4$), wherein the offset value ($\Delta\theta$) also increases as the value of the fourth statistical moment ($M_4$) increases.

11. The method of claim 3, wherein the offset value ($\Delta\theta$) for the blade pitch angle ($\theta$) depends on the value of an out of plane bending moment of at least one blade, wherein the offset value ($\Delta\theta$) also increases as the value of the bending increases.

12. The method of claim 1, wherein, if at least one of the statistical moments ($M_3$, $M_4$) falls below a predetermined shutdown threshold value, control of the wind turbine returns to previous operation over a predetermined time duration.

13. The method of claim 12, wherein control of the wind turbine only returns to previous operation if the third statistical moment ($M_3$) is not positive.

14. The method of claim 1, wherein the detection signal ($C_{EGLM}$) for an extreme gust can only be generated when the generator speed is greater than a minimum speed.

15. The method of claim 1, wherein the detection signal ($C_{EGLM}$) for an extreme gust can only be generated when the wind speed is greater than a minimum wind speed.

16. The method of claim 1, wherein the detection signal ($C_{EGLM}$) for an extreme gust can only be generated when the wind turbine is being operated and feeds power into the grid.

17. The method of claim 1, wherein the detection signal ($C_{EGLM}$) for an extreme gust can only be generated when the third statistical moment ($M_3$) is greater than a predetermined minimum value and/or increases.

18. The method of claim 12, wherein the time duration has a value of 10 seconds to 50 seconds.

19. The method of claim 12, wherein the time duration has a value of 20 seconds to 40 seconds.

20. The method of claim 2, wherein the setpoint value for the blade pitch angle ($\theta_{set}$) is increased by an offset value ($\Delta\theta$) starting from an actual value for the blade pitch angle ($\theta_{act}$) or is set to a predetermined value ($\theta_{fix}$).

\* \* \* \* \*

UNITED STATES PATENT AND TRADEMARK OFFICE
CERTIFICATE OF CORRECTION

PATENT NO. : 11,629,695 B2
APPLICATION NO. : 16/737486
DATED : April 18, 2023
INVENTOR(S) : Michael Niss It is certified that error appears in the above-identified patent and that said Letters Patent is hereby corrected as shown below:

In the Specification

In Column 4:
Line 5: delete "$M_4 = E((X - \mu) = E((X - E(X))^4)$," and insert -- $M_4 = E((X - \mu)^4) = E((X - E(X))^4)$, -- therefor.

Signed and Sealed this
Eighteenth Day of July, 2023

Katherine Kelly Vidal
*Director of the United States Patent and Trademark Office*